(12) United States Patent
Gopinath et al.

(10) Patent No.: US 11,221,435 B2
(45) Date of Patent: Jan. 11, 2022

(54) WIDE-ANGLE BEAM STEERING

(71) Applicant: The Regents of the University of Colorado, a body corporate, Denver, CO (US)

(72) Inventors: Juliet T. Gopinath, Boulder, CO (US); Victor M. Bright, Boulder, CO (US); Mo Zohrabi, Boulder, CO (US); Robert H. Cormack, Erie, CO (US)

(73) Assignee: The Regents of the University of Colorado a body corporate, Denver, CO (US)

( * ) Notice: Subject to any disclaimer, the term of this patent is extended or adjusted under 35 U.S.C. 154(b) by 349 days.

(21) Appl. No.: 16/326,159

(22) PCT Filed: Aug. 15, 2017

(86) PCT No.: PCT/US2017/046970
§ 371 (c)(1),
(2) Date: Feb. 15, 2019

(87) PCT Pub. No.: WO2018/097869
PCT Pub. Date: May 31, 2018

(65) Prior Publication Data
US 2021/0333443 A1 Oct. 28, 2021

Related U.S. Application Data

(60) Provisional application No. 62/375,754, filed on Aug. 16, 2016.

(51) Int. Cl.
| | |
|---|---|
| *G02B 3/00* | (2006.01) |
| *G02B 3/12* | (2006.01) |
| *G02B 26/00* | (2006.01) |
| *G02B 26/10* | (2006.01) |
| *G02B 26/08* | (2006.01) |

(52) U.S. Cl.
CPC .............. *G02B 3/12* (2013.01); *G02B 26/005* (2013.01); *G02B 26/0875* (2013.01); *G02B 26/101* (2013.01); *G02B 2207/115* (2013.01)

(58) Field of Classification Search
CPC .... G02B 3/12; G02B 26/005; G02B 26/0875; G02B 26/101; G02B 2207/115
USPC .......................................................... 359/665
See application file for complete search history.

(56) References Cited

U.S. PATENT DOCUMENTS

| | | |
|---|---|---|
| 2009/0273850 A1 | 11/2009 | Wo et al. |
| 2017/0010456 A1 | 1/2017 | Gopinath et al. |

FOREIGN PATENT DOCUMENTS

| | | |
|---|---|---|
| WO | 2015/112770 | 7/2015 |

*Primary Examiner* — James C. Jones
(74) *Attorney, Agent, or Firm* — Macheledt Bales LLP; Jennifer L. Bales

(57) ABSTRACT

Wide-angle beam steering using two or more variable lenses to form a small-angle beam steering element, along with a numerical aperture converter and a wide-angle lens. The small-angle beam steering element might comprise either one- or two-dimensional beam steering with tunable liquid lenses.

19 Claims, 7 Drawing Sheets

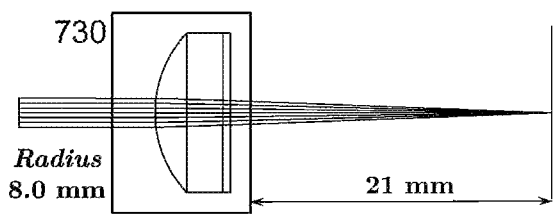
Figure 7A
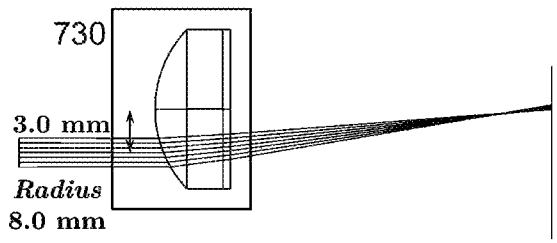
Figure 7C
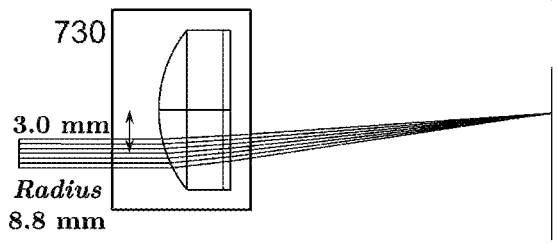
Figure 7C
Figure 8A
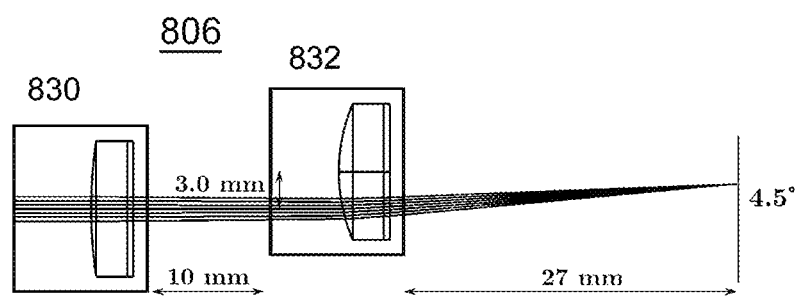
Figure 8B
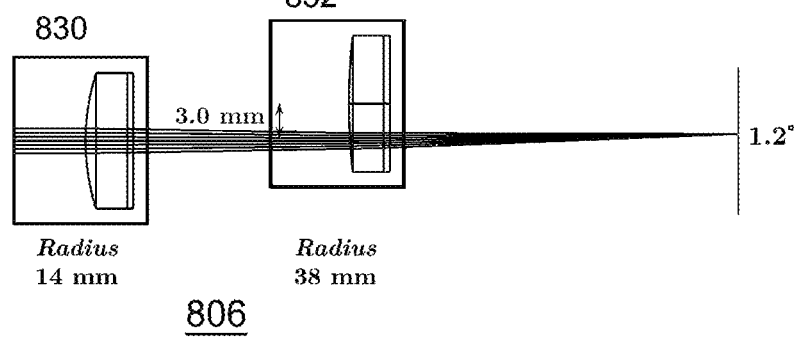

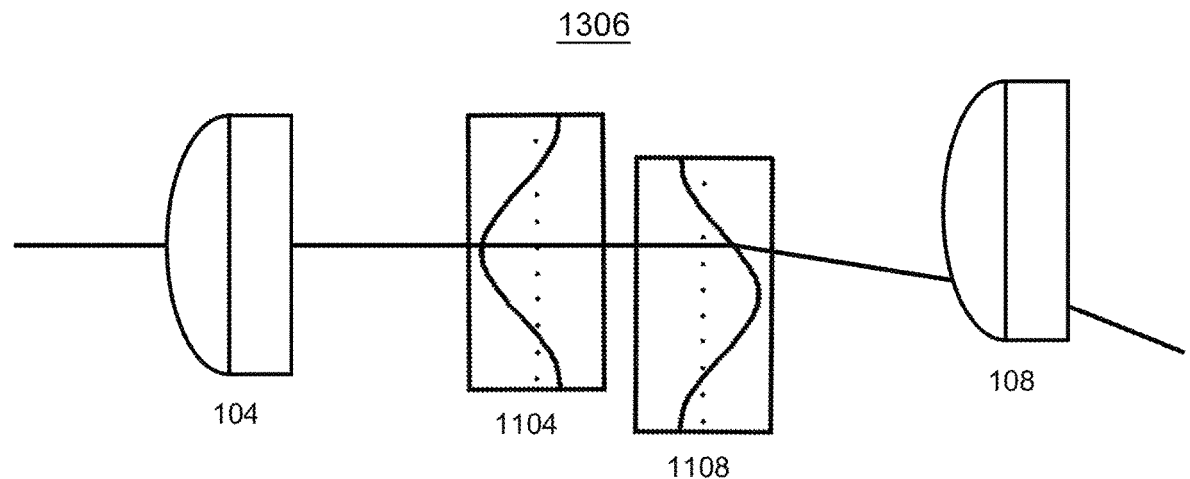
Figure 13
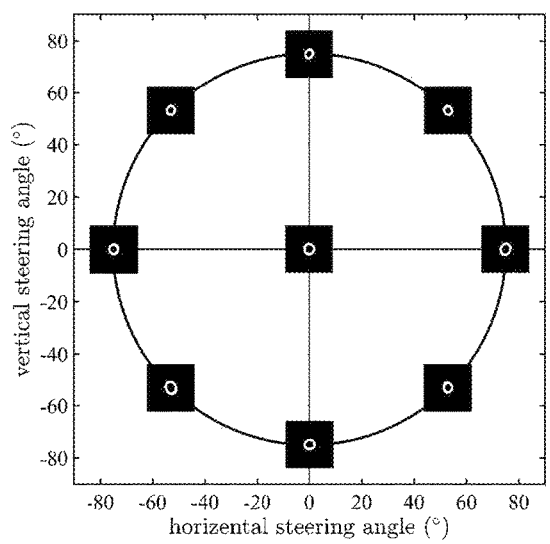 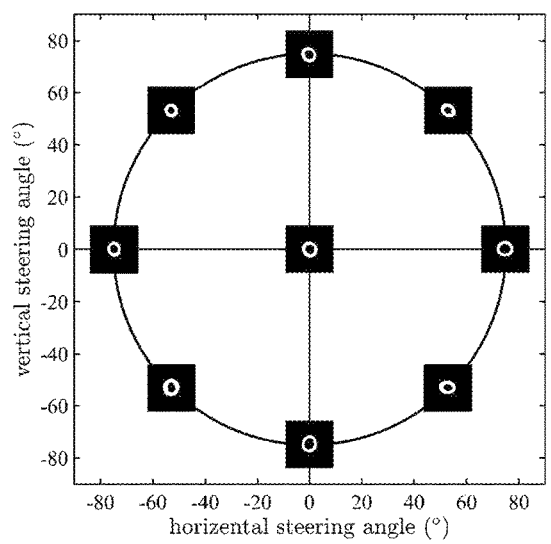
Figure 14A          Figure 14B

WIDE-ANGLE BEAM STEERING

This invention was made with government support under contract number N00014-15-1-2739 awarded by the Office of Naval Research. The government has certain rights in this invention.

BACKGROUND OF THE INVENTION

Field of the Invention

The present invention relates to wide-angle beam steering using two or more variable lenses to form a small-angle beam steering element, along with a numerical aperture converter and a wide-angle lens.

Discussion of Related Art

Optical beam scanning methods have a wide range of applications including optical communications, light detection and ranging systems (LIDAR/LADAR), laser micromachining, imaging, displays, microscopy, atomic and biophysics. Beam steering is important for fluorescence imaging through confocal and multi-photon microscopy. In atomic physics, optical trapping studies rely on beam control to manipulate the optical trap position and stiffness through laser beam angle. Another application, LIDAR, requires wide angle scans to be effective for a variety of applications ranging from mapping to self-driving cars.

Beam steering techniques fall into two main categories: mechanical and non-mechanical. Mechanical methods include scanning mirrors, rotating prisms, piezos actuator, and MEMS mirrors. However, mechanical parts have a limited lifetime and non-mechanical solutions can offer a better alternative. Non-mechanical options include acousto-optic deflectors, electro-optic deflectors and spatial light modulators. While effective, all of these methods have their limitations. For instance, SLMs rely on diffraction, meaning that there is some loss due to other orders.

Liquid-based, adaptive optical components offer a compact, low-loss solution. These are attractive due to their large range of tunable focal lengths, fast response times (ms to p s depending on their sizes), low power consumption, and most importantly their robustness, as they have no moving components. There are two types of liquid-based components. The first relies on the electrowetting principle, and the other uses a pressure-driven elastic membrane.

SUMMARY

It is an object of the present invention to provide improved wide-angle beam steering. Beam steering apparatus according to the present invention comprises a small-angle beam steering element, a numerical aperture converter, and a wide-angle lens element. The small-angle beam steering element might comprise either one- or two-dimensional beam steering with tunable liquid lenses.

As an example, 1D beam steering might be accomplished with a first variable lens centered on the beam axis and a second variable lens decentered from the axis. The second lens steers the beam according to its power, and the first lens compensates for divergence changes that would otherwise result from the changing power of the first lens. To accomplish 2D beam steering, a third variable lens is decentered relative to both the input beam and the second lens to beam steer in a second direction. Then the first lens can be adjusted to compensate for both the second lens and the third lens. Electrowetting or pressure-driven liquid lenses or prisms (or combinations of these) work well.

Continuous 1D beam steering was modeled and demonstrated experimentally with steering angles of ±39° using two tunable liquid lenses in the small-angle beam steering element. The beam scanning angle was further enhanced to ±75° using a fish-eye lens. By adding a third tunable liquid lens, 2D beam steering of ±75° was achieved.

The numerical aperture (N.A.) converter operates to convert a narrow beam to an expanding, high N.A. beam suitable for LIDAR and the like. The N.A. converter might comprise a diffuser plate, a lenslet array, a fiber optic plate (fiber face plate), etc. The capability to steer the beam at large angles in addition to adjusting the beam size at different angles is a powerful tool for many applications such as microscopy and LIDAR.

The wide-angle lens element is designed to substantially increase the scanning angle provided by the small-angle beam steering element. It might comprise a wide-angle lens, a ball lens, a fish-eye lens or various other lenses or other optical elements.

The present invention includes a novel method to achieve 1D and 2D beam steering which relies on liquid-based lenses. Liquid lenses are commercially available, which makes them an excellent candidate for next-generation, non-mechanical beam steering. Embodiments based on liquid lenses demonstrate ultra-wide angle 1D and 2D beam steering while controlling the steered beam spot size. Some preferred embodiments use pressure-driven liquid lenses due to their large aperture, since electrowetting components are limited in size and by gravitational effects. By utilizing two tunable liquid lenses, we are able to perform continuous one-dimensional beam steering to ±39°, which is further enhanced with a fish-eye lens to ±75°. Adding a third liquid lens allows us to accomplish continuous, two-dimensional beam scanning on a hemisphere with ±75° angles in all directions.

Liquid lenses can also be driven at resonant frequencies of the surface waves on the lens, producing shapes similar to the standing waves on a drum head. These standing waves are not standard lens shapes, but can nevertheless be used to scan a beam, as we show. The advantage of this is that the beam can be scanned multiple times as fast as is possible when driving the liquid lens shapes more slowly between classical lens shapes.

When liquid lenses are used in resonant mode, it is convenient to use two other, non-resonant variable lenses to accomplish 2D small-angle beam steering, as it is difficult for a variable lens in resonant mode to compensate for a variable lens in non-resonant mode and vice versa. One of the non-resonant lenses is on-axis and the other is off-axis to the first non-resonant lens. The non-resonant lenses are typically placed on either side of the resonant lens pair.

Relay optics may be used and might comprise a lens or telescope optics.

BRIEF DESCRIPTION OF THE DRAWINGS

FIGS. 7(a), 7(b), and 7(c) are side schematic views showing beam steering with variable focal length lenses.

FIGS. 8(a) and 8(b) are side schematic views showing small-angle beam steering elements of FIGS. 1 and 2 comprising two tunable liquid lenses.

FIG. 13 is a side schematic view of a 2D beam steering apparatus according to the present invention using the small-angle beam steering element of FIGS. 12A and 12B along with a beam steering element comprising two variable lenses operated in a slow, non-resonant manner.

FIGS. 14A and 14B are schematic plots illustrating the spot size at a detector ***

DETAILED DESCRIPTION OF THE INVENTION

Table 1 shows the elements of the present invention along with their associated reference numbers.

TABLE 1

| Reference No. | Element |
| --- | --- |
| 100 | 1D wide angle beam steering apparatus |
| 102 | Input beam |
| 104, 108, 208 | Variable lens |
| 106, 206, 806, 1206 | Small-angle beam steering element |
| 110, 210 | Small-angle steered beam |
| 112, 312, 412, 512 | Numerical Aperture converter |
| 114, 214, 314, 414, 514 | N.A. converted beam |
| 116, 616, 916, 1016 | Wide-angle lens |
| 118, 218, | Output beam at detector |
| 120 | Detector |
| 730, 830, 832 | Tunable liquid lens |
| 830, 832 | Tunable liquid lens |
| 916 | Two-lens wide-angle lens |
| 930 | Relay lens |
| 1104, 1108 | Resonant tunable liquid lens |
| 1140 | Resonant surface |
| 1206 | Resonant small-angle beam steering element |
| 1502 | Commercial LIDAR unit |
| 1504 | Laser |
| 1506 | Receiver |
| 1508 | Circulator |

Figure 1:
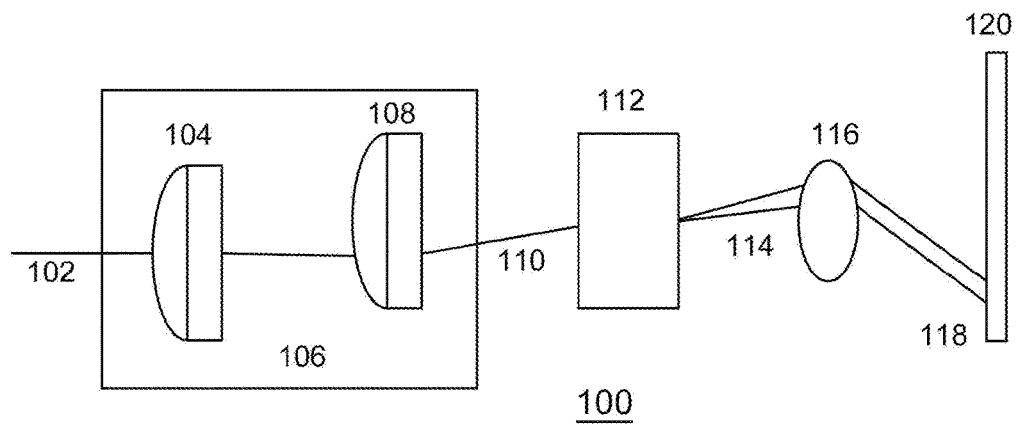
FIG. 1 is a schematic block diagram illustrating wide-angle 1D beam steering apparatus according to the present invention.

FIG. 1 is a schematic block diagram illustrating wide-angle 1D beam steering device 100 according to the present invention. Small-angle beam steering element 106 comprises two variable lenses 104, 108. Thus, input beam 102 is steered to form small-angle steered beam 110. Numerical aperture converter converts narrow small-angle steered beam 110 to N.A. converted beam 114. Wide-angle lens 116 increases the steered angle of the beam and focuses it on detector 120 as output beam 118.

Variable lens 108 is off-axis to input beam 102, so it provides the small-angle beam steering. Variable lens 104 is on beam axis and compensates for the power of lens 108, and thus the convergence/divergence that would otherwise appear in beam 110. Herein, the term "divergence compensation" is used to describe this effect for simplicity, though the effect compensates for either convergence or divergence. Thus, variable lens 104 provides divergence compensation for variable lens 108.

Figure 2:
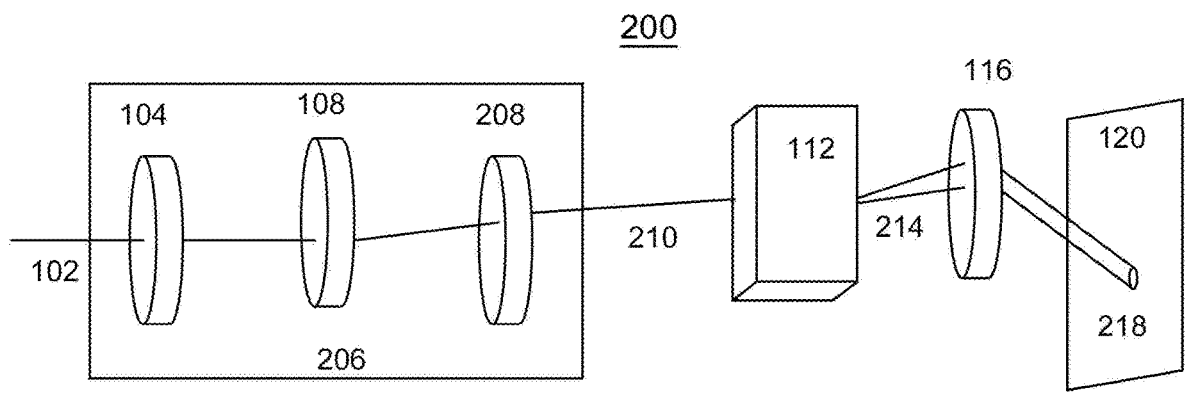
FIG. 2 is a schematic block diagram illustrating wide-angle 2D beam steering apparatus according to the present invention.

FIG. 2 is a schematic block diagram illustrating wide-angle 2D beam steering device 200. It operates similarly to device 100, except that a third variable lens 208 is added to steer the beam in another dimension. Variable lens 208 is decentered perpendicularly to lens 108. Altering the curvature of lenses 108, 208 accomplishes 2D beam steering.

For a narrow beam—smaller than the lens aperture—a decentered lens acts much like a combination of a centered lens plus a prism. The centered adjustment lens is used to compensate for the lens effect, leaving the total effect that of a simple prism: The decentered beam simply changes direction. The advantage of using two variable lenses to do this is that the net effect is substantially that of a variable prism.

Variable lens 104 now provides divergence compensation for both lens 108 and lens 208, and thus controls the divergence of beam 114 on N.A. converter 112. Small-angle steered beam 210 is now steered both horizontally and vertically (in the example of FIG. 2) and hence output beam 218 may be directed both horizontally and vertically at detector 218.

Figure 3:
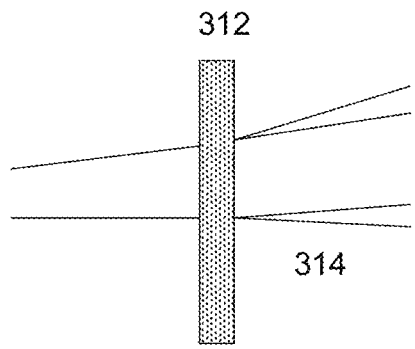
FIG. 3 is a schematic block diagram illustrating the use of a diffuser plate as the N.A. converter of FIGS. 1 and 2.

FIG. 3 is a schematic block diagram illustrating the use of a diffuser plate 312 as N.A. converter 112. Diffuser plate 312 may comprise, for example, a ground glass surface or a holographic element. It does not operate reciprocally, at least not without additional optical elements. N.A. converted beam 314 is a diffuse, spreading beam that exits at the same angle it entered.

Figure 4:
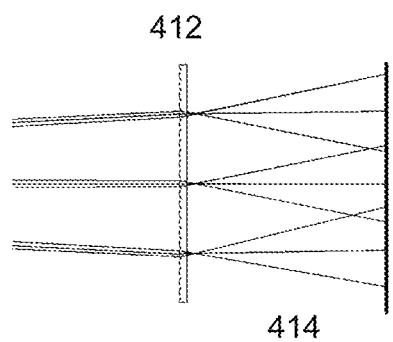
FIG. 4 is a schematic block diagram illustrating the use of a lenslet array as the N.A. converter of FIGS. 1 and 2.

FIG. 4 is a schematic block diagram illustrating the use of a lenslet array 412 as N.A. converter 112. Lenslet array 412 is a reciprocal device, and thus is particularly useful in a system such as that shown in FIG. 15.

Figure 5:
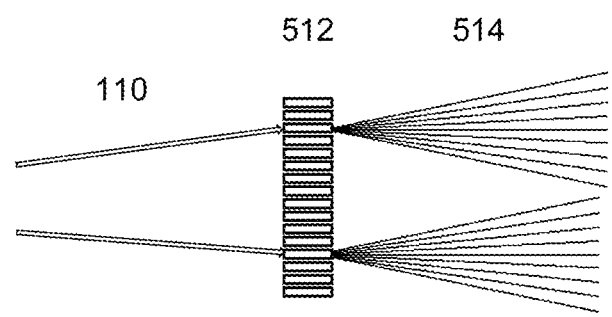
FIG. 5 is a schematic block diagram illustrating the use of a fiber optic plate as the N.A. converter of FIGS. 1 and 2.

FIG. 5 is a schematic block diagram illustrating the use of a fiber optic plate 512 as N.A. converter 112. Like diffuser plate 312, it is not a reciprocal device.

Figure 6:
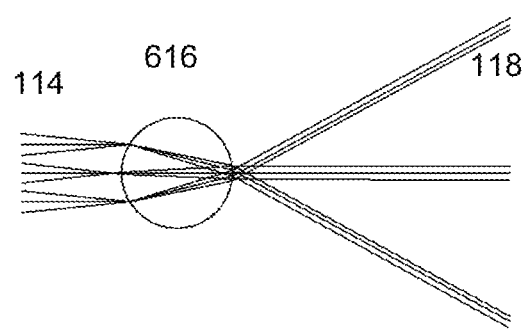
FIG. 6 is a schematic block diagram illustrating the use of a ball lens as the wide-angle lens of FIGS. 1 and 2.

FIG. 6 is a schematic block diagram illustrating the use of a ball lens 616 as wide-angle lens 116. In practice, a ball lens can convert a plus or minus 4° beam to a plus or minus 40° beam. Ball lenses are easily available and inexpensive.

FIGS. 7A, 7B, and 7C are side schematic views showing beam steering with a tunable liquid lens 230. In FIG. 7A, a 2 mm collimated beam is focused to an image plane using a centered lens 730 with radius of curvature 8.0 mm. In FIG. 7B, lens 730 is decentered by 3.0 mm from the optical axis, resulting in steering and defocusing of the beam using 8 mm radius of curvature. The steering angle is 8.7. In FIG. 7A, the curvature of lens 730 is adjusted to 8.8 mm to minimize the spot size, which results in a shift of the steering angle from 8.7 to 7.5.

Beam steering with single tunable liquid lenses is possible, but has disadvantages. The amount of beam steering that can be accomplished is small, and the beam at 0° (FIG. 7A) focuses at a different spot than the beam steered 8.7° (FIG. 7B), by moving the input beam off-axis by 3 mm.

Note, though, that a slightly different input beam radius (8.8 mm instead of 8 mm) results in a focal point at 21 mm, as was the case for no beam steering in FIG. 7A. Thus, changing input beam radius can be used to compensate for the changed focal length seen in FIG. 7B.

FIGS. 8A and 8B are side schematic views showing small-angle beam steering element 106 of FIG. 1 wherein variable lens 108 comprises a tunable liquid lens 832 and variable lens 104 comprises tunable liquid lens 830. Lens 832 determines the beam steering angle, and lens 830 provides divergence compensation. Thus, the focal spot of each steered beam is at the same point, even though the beam of FIG. 8A is steered at 4.5° and the beam of FIG. 8B is steered at 1.2°.

By adjusting the curvature of lens 830, we can control the spot size while keeping the steering angle fixed. FIG. 8A shows an example configuration with lenses with radii of 37 mm and 18.0 mm, respectively. This results in a steering angle of 4.5°. Changing the radii of the two lenses 830, 832 to 14 mm and 38 mm, respectively, results in a steering angle of 1.2°, as shown in FIG. 8B. Lens 832 controls the steering angle of the beam and behaves like a prism. To attain a larger steering angle for a given input beam size, one needs a tunable lens with larger optical power. This example uses commercial tunable liquid lenses (Optotune EL-10-30) with a radius range of 14 to 38 mm (focal length of 50-120 mm). For a 2-mm collimated beam, the optical power range of this lens limits the steering angle change to 5°. This constraint can be improved to plus or minus 5° by using an off-axis tunable lens with both positive and negative optical powers, while keeping the aperture size fixed.

Figure 9:
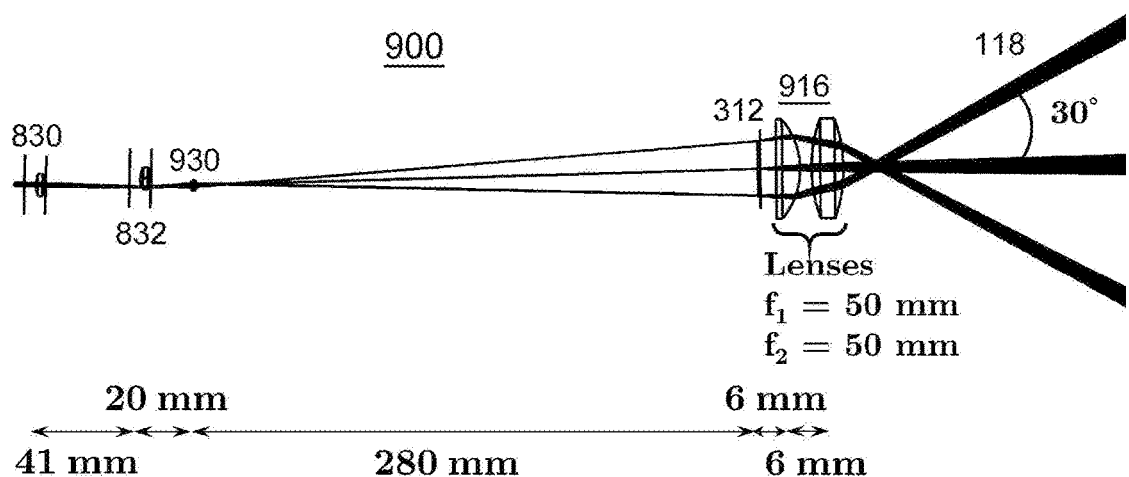
FIG. 9 is a side schematic view of a specific example of a wide-angle 1D beam steering apparatus according to the present invention.

FIG. 9 is a side schematic view of a specific example 900 of a wide-angle 1D beam steering apparatus 100. The setup uses two tunable liquid lenses 830, 832. A relay lens 930 is used to position a focused beam on diffuser 312. Diffuser 312 converts a focused point source to a diffusion cone with an angle of 15°. The resulting high N.A. beam is magnified through two lenses 916, in this case plano-convex and double-convex lenses with a focal length of 50 mm. This configuration results in a beam scanning angle of 39° with respect to the optical axis of the lenses.

Those skilled in the art will appreciate that this configuration could easily be expanded to 2D scanning by adding a third lens 208 (see FIG. 2).

Figure 10:
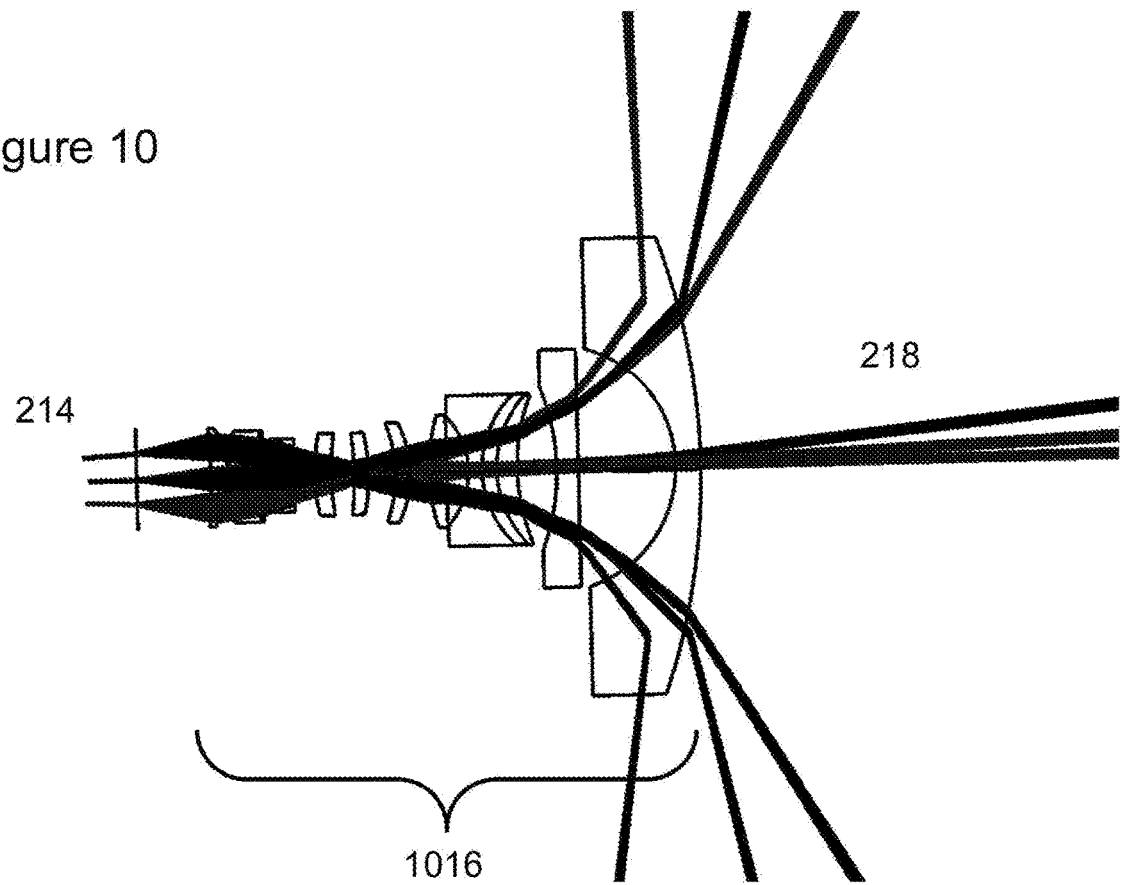
FIG. 10 is a side schematic view of a fish-eye lens used as the wide-angle lens of FIGS. 1 and 2.

FIG. 10 is a side schematic view of a fish-eye lens 1016 used as the wide-angle lens 116 for 2D steering device 200. The 2D hemisphere scan was modeled in Zemax using a sample fisheye lens adopted from Zebase library (F_004). This configuration resulted in 2D beam scanning angle of 90 (180) in all directions. Of course, fish-eye lens 1016 could also be used in a 1D scanning configuration as well.

Figure 11A:
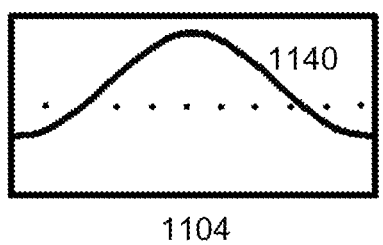
FIGS. 11A and 11B are side schematic views of a tunable liquid lens operated in a standing-wave mode to form fast-response resonant elements.
Figure 11B:
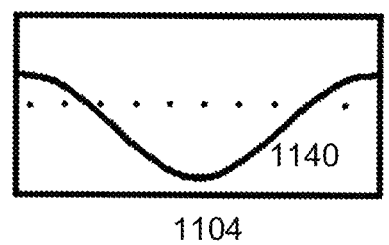

FIGS. 11A and 11B are side schematic views of an electrowetting liquid lens 1104 operated in a standing-wave mode to form a fast-response resonant element. For example, the commercially available Varioptic lens has its first resonance (depicted here) at a frequency of 57 Hz. Smaller lenses, such as can be easily fabricated, would have higher frequency modes, as well as lenses with less viscous fluids.)

The speed of a liquid lens is in general limited because the liquid surface cannot follow fast voltage changes. Thus, it might take a few 10's of milliseconds to scan a beam across its range in conventional operation. Surface waves, on the other hand, oscillate quickly, so that an electrowetting lens will scan through its range in two milliseconds or less.

FIGS. 11A and 11B illustrate the extremes of a first order standing wave surface 1140 in lens 1104. The surfaces resemble Bessel functions. The center three quarters of each surface forms a nearly symmetric positive and negative lens surface, even though an electrowetting lens conventionally operated can only do one power and not the opposite. The outer edge of the surface is nearly flat, unlike the steady-state EW surface, which would have the steepest curvature on the edges. These characteristics are due to the fact that these are not transient effects (that is, shapes the surface goes through on the way to some steady-state solution), but a resonant oscillation. The oscillation is driven by very small (~30 mv) drive signal. This drive signal isn't likely to be enough to cause any perceptible change in the edge slope, but because it is at the first mode's resonant frequency, it causes a large resonant oscillation to build up.

How to scan with this oscillating surface 1140:

I) The center of the surface is mostly a spherical (but oscillating) lens. Hence sending a narrow beam through the lens at the right offset location results in an oscillating 1D scan of that beam. One useful location is a little more than halfway from the edge to the center—far enough that the flat edge effect is minimal and where the surface is undergoing the greatest oscillation of slope.

Figure 12A:
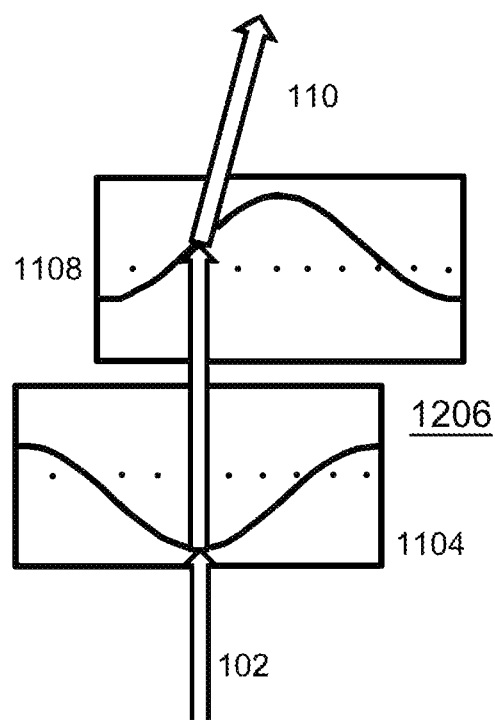
FIGS. 12A and 12B are side schematic views illustrating devices according to FIGS. 11A and 11B configured as small angle beam-steering elements.
Figure 12B:
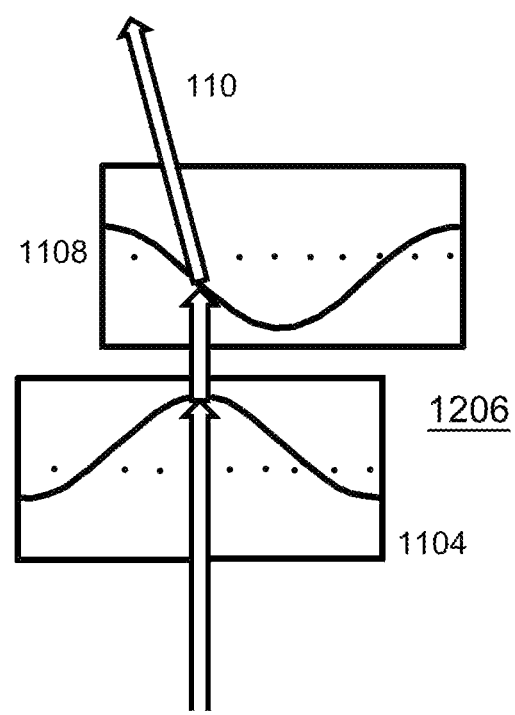

II) Since the surface is also changing curvature (as well as slope) there is also an oscillation of the scanned beam between converging and diverging, so divergence compensation must be provided as shown in FIGS. 12A and 12B.

FIGS. 11A and 11B show the 1st mode that runs at about 59 Hz or 16 ms to scan from one extreme to the other extreme.

FIGS. 12A and 12B are side schematic views illustrating two identical devices 1104 and 1108, as described FIGS. 11A and 11B, configured to form a small-angle beam-steering element 1206.

1104 is a second identical lens to 1108 driven at the same resonant frequency, but at a 180 degree phase shift, on axis in the input beam. The power in lens 1104 is always opposite to the power in the scan lens 1108, so lens 1104 provides divergence compensation to cancel the change in power of lens 1108, resulting in a substantially collimated, scanned output beam.

FIG. 12A shows a first configuration of small-angle beam-steering element 1206, which steers the beam to the right (in this figure) while FIG. 12B is driven to steer the beam to the left. In use, the beam is rapidly scanned back and forth over the range of angles.

It is possible to bias lenses 1104 and 1108 to steer predominantly to one side or the other if desired. Biasing would allow a fast, harmonic, scanner which could be converted (by the appropriate DC drive signal) to a fixed beam at each of the various output angles, since the scan angles could be limited to those achievable by static shapes that the lenses can be driven to.

FIG. 13 is a side schematic view of a 2D small-angle beam steering device 1306 according to the present invention. Small-angle beam steering apparatus 1306 uses the small-angle beam steering element 1206 of FIGS. 12A and 12B as well as a small-angle beam steering element similar to element 106, comprising two variable lenses operated in a slow, non-resonant manner and placed on either side of element 1206. This could produce a fast raster scan, where one direction of scan is much faster than the other.

Referring back to FIG. 2, in small-angle beam steering element 206, a single lens 104 was capable of compensating for the power changes of both lenses 108 and 208. In device 1306, two divergence compensating lenses 104 and 1104 are used, because steering lenses 1108, 108 are operating at such different speeds. 1108 is resonant and performing a fast scan, while lens 108 is operating conventionally and thus performing a slow scan. Compensating lenses 104 and 1104 are thus generally both placed on-axis.

Those skilled in the art will appreciate that all of the lenses could be operated in resonant mode, but this is rarely useful since synching both small-angle beam elements is tricky, and only one scan direction needs to be fast (e.g. to scan over a row in the time it takes the slower scan to move to a new row).

FIGS. 14A and 14B are schematic plots illustrating the spot size at a detector given an example of 2D beam scanning at different steering angles using a commercial fisheye lens. The beam was scanned horizontally and vertically between −75° to 75°. FIG. 14A shows modeled images of the minimum spot size after adjusting the focal length of the first tunable lens. The images shown here are not represented as actual size for display purposes, but are all on the same scale. FIG. 14B shows modeled images of the spot on the camera after changing the focal length of the first lens by 8 mm. Note that the spot size is here somewhat larger than in FIG. 14A.

In this example, the beam was scanned horizontally and vertically from −75° to 75°. FIG. 14A shows the minimum spot size at different steering angles horizontally and vertically. FIG. 14B displays images of the beam spot at various steering angles after changing the focal length of the first tunable lens by 8 mm. The absolute focal length number is different at every angle in FIG. 14A, however, the difference in the focal length (8 mm) was kept fixed at all angles to generate FIG. 14A. The areas of the minimum spot at (0°,0°) and (0°,−75°) are 0.071 mm2 and 0.068 mm2, respectively, which then become 0.129 mm2 and 0.112 mm2 after changing the focal length by 8 mm. This method can be implemented in many airborne and ground-based LIDAR systems, where wide-angle scans are required. Typical beam divergences for LIDAR systems are 0.1-2 mrad, and are often controlled with beam expansion optics. The present invention offers an elegant non-mechanical alternative to control the beam divergence. In addition, beam diameters for LIDAR typically range from a few cm to tens of meters, depending on the target size. The present invention has the ability to generate few mm to few cm beam diameter.

Figure 15:
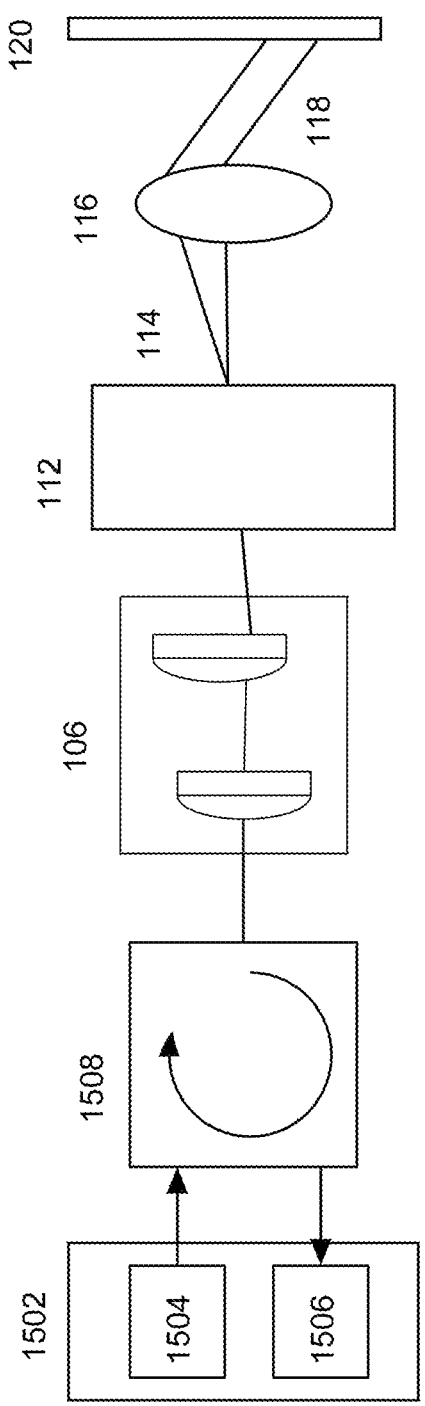
FIG. 15 is a schematic block diagram illustrating a wide-angle 1D beam steering device according to the present invention, configured for a adjacent laser and detector.

FIG. 15 is a schematic block diagram illustrating wide-angle 1D beam steering device 1500 configured for co-located laser and detector. Commercial LIDAR systems often use an integral device 1502 having both the laser 1504 and the detector 1506 co-located. Therefore, the embodiment of FIG. 15 is configured for device 1502. Circulator 1508 allows laser light (from laser 1504) to be provided to small-angle beam steering element 106 and a reciprocal N.A. converter (such as lenslet array 412) allows the reflected beam to return along the same path given a reciprocal N.A. converter). For the case of a non-reciprocal N.A. converter (diffuser or fiber plate), other methods of detecting the return beam must be used, such as a separate receiving lens, or an annular detector designed to let the outgoing beam pass through the center. It is possible to use a circulator which accepts a wide cone of light for the returned light. Since the return light is separated from the outgoing light inside the circulator, extra optics added to the return path concentrate the return light onto a detector. This system could then use a non-reciprocal N.A. convertors and still use only one set of transmission/reception optics, as in the diagram.

When the return beam reaches the circulator, it is directed to the detector, 1506. Both polarization maintaining and polarization independent circulators are well-known devices.

While the exemplary preferred embodiments of the present invention are described herein with particularity, those skilled in the art will appreciate various changes, additions, and applications other than those specifically mentioned, which are within the spirit of this invention. For example, the small angle scanning could be achieved by an alternate technology known in the art, such as a variable prism—either mechanical (Risley prisms, or liquid-filled prisms with tilt plates such as are used in stabilized camera lenses) or based on electrowetting techniques like liquid prisms. The method in this patent of converting such a small angle scan to a large angle scan, with a large Numerical Aperture or large beam size would apply just as well.

The invention claimed is:

1. Apparatus for wide-angle beam steering of an input beam comprising:
   a small-angle beam steering element for steering the input beam to form a small-angle steered beam;
   a numerical aperture converter for spreading the small-angle steered beam; and
   a wide-angle optical element for increasing a scanned angle of the spread beam up to at least about +/−75°;
   wherein the small-angle beam steering element is configured to compensate for divergence changes cause by the wide-angle element, thereby controlling the divergence of the beam.

2. The apparatus of claim 1 wherein the small-angle beam steering element comprises a first variable lens configured to be centered on the input beam and a second variable lens configured to be decentered relative to the input beam, thereby scanning the beam, and wherein the first tunable lens is configured to compensate for variable divergence of the second variable lens.

3. The apparatus of claim 2 wherein the first variable lens and the second variable lens each comprise one of the following:
   tunable pressure-driven liquid lens
   tunable electrowetting liquid lens
   tunable electrowetting liquid prism.

4. The apparatus of claim 2, further comprising:
   a third variable lens configured to be decentered relative to the input beam and relative to the second variable liquid lens, thereby scanning the beam in a second dimension; and
   wherein the first variable lens further compensates for variable divergence of the third variable lens.

5. The apparatus of claim 4 wherein the first variable lens, the second variable lens, and the third variable lens each comprise one of the following:
   tunable pressure-driven liquid lens
   tunable electrowetting liquid lens
   tunable electrowetting liquid prism.

6. The apparatus of claim 2 wherein the first variable lens and the second variable lens each comprise an electrowetting liquid lens operating in resonant mode and wherein the second variable lens is driven at the same resonant frequency as the first variable lens, but at a 180-degree phase shift.

7. The apparatus of claim 6 further comprising a third variable lens and a fourth variable lens, wherein the third variable lens is on the beam axis and the fourth variable lens is off the beam axis and off the axis of the second variable lens, and wherein the third variable lens is configured to compensate for divergence of the fourth variable lens.

8. The apparatus of claim 1 wherein the numerical aperture converter includes one of the following:
   a diffuser;

a microlens array;
a fiber face plate.

9. The apparatus of claim 1 wherein the small-angle beam steering element includes mechanical elements.

10. The apparatus of claim 9 wherein the small-angle beam steering element includes one of the following:
Risley prisms;
liquid-filled prisms with tilt plates.

11. The apparatus of claim 1 wherein the wide-angle optical element includes one of the following:
a wide-angle lens;
a fisheye lens;
a ball lens;
a combination of lenses.

12. A beam steering device comprising:
a first tunable liquid lens configured to be centered on the input beam for divergence control;
a second tunable liquid lens configured to be decentered relative to the input beam, thereby scanning the beam;
a numerical aperture converter; and
a wide-angle lens element for increasing a scanned angle of an output beam up to at least about +/−75°;
wherein the first tunable liquid lens is configured to compensate for a focal change caused by the second tunable liquid lens, resulting in a compensated beam; and
wherein the numerical aperture converter is configured to spread the compensated beam.

13. The apparatus of claim 12 wherein the numerical aperture converter includes one of the following:
a diffuser;
a microlens array;
a fiber face plate.

14. The apparatus of claim 12 wherein the wide-angle lens element includes one of the following:
a fisheye lens;
a ball lens;
a wide-angle lens;
a combination of lenses.

15. The apparatus of claim 12, further comprising:
a third tunable liquid lens configured to be decentered relative to the input beam and relative to the second tunable liquid lens, thereby scanning the beam in a second dimension; and
wherein the first tunable lens further compensates for the focal change caused by the third tunable liquid lens.

16. A small-angle beam steering device for steering an input beam comprising:
a first tunable liquid lens configured to be centered on the input beam; and
a second tunable liquid lens configured to be decentered relative to the input beam, thereby scanning the beam;
wherein the first lens is configured to compensate for a focal change caused by the second tunable liquid lens;
and wherein the first lens is configured to compensate for divergence changes cause by the wide-angle element, thereby controlling the divergence of the beam.

17. The device of claim 16 further comprising:
a third tunable liquid lens configured to be decentered relative to the input beam and relative to the second tunable liquid lens, thereby scanning the beam in a second dimension.

18. The device of claim 17 wherein the tunable liquid lenses each comprise one of the following:
tunable pressure-driven liquid lens
tunable electrowetting liquid lens
tunable electrowetting liquid prism.

19. The device of claim 16 wherein the tunable liquid lenses each comprise one of the following:
tunable pressure-driven liquid lens
tunable electrowetting liquid lens
tunable electrowetting liquid prism.

* * * * *